United States Patent
Chen et al.

(10) Patent No.: US 9,451,206 B2
(45) Date of Patent: Sep. 20, 2016

(54) IMAGE PROCESSING APPARATUS, FRAME RATE CONTROL PROCESS DETERMINATION APPARATUS, AND METHOD

(71) Applicant: EIZO Corporation, Ishikawa (JP)

(72) Inventors: Haifeng Chen, Ishikawa (JP); Masafumi Higashi, Ishikawa (JP)

(73) Assignee: EIZO CORPORATION, Ishikawa (JP)

( * ) Notice: Subject to any disclaimer, the term of this patent is extended or adjusted under 35 U.S.C. 154(b) by 0 days.

(21) Appl. No.: 14/818,248

(22) Filed: Aug. 4, 2015

(65) Prior Publication Data

US 2015/0341592 A1 Nov. 26, 2015

Related U.S. Application Data

(63) Continuation of application No. PCT/JP2013/073088, filed on Aug. 29, 2013.

(30) Foreign Application Priority Data

Feb. 6, 2013 (JP) ................. 2013-020975

(51) Int. Cl.
| | |
|---|---|
| H04N 7/01 | (2006.01) |
| H04N 5/14 | (2006.01) |
| G06K 9/00 | (2006.01) |
| G06T 7/20 | (2006.01) |

(52) U.S. Cl.
CPC ........ *H04N 7/0127* (2013.01); *G06K 9/00523* (2013.01); *G06T 7/2006* (2013.01); *H04N 5/144* (2013.01); *G06T 2207/10016* (2013.01); *G06T 2207/20144* (2013.01)

(58) Field of Classification Search
CPC ... G06T 7/2006; H04N 5/144; H04N 7/0127
USPC ......... 348/441, 443, 440.1, 452, 451, 412.1, 348/415.1; 382/236, 239; 375/240.01, 375/240.26
See application file for complete search history.

(56) References Cited

U.S. PATENT DOCUMENTS

| | | | | |
|---|---|---|---|---|
| 5,903,673 | A | * | 5/1999 | Wang ..................... G06T 9/007 382/236 |
| 2011/0254874 | A1 | | 10/2011 | Kikuta |
| 2012/0086628 | A1 | | 4/2012 | Ichioka et al. |
| 2014/0126827 | A1 | | 5/2014 | Chen |

FOREIGN PATENT DOCUMENTS

| | | |
|---|---|---|
| JP | 2002-287709 A | 10/2002 |
| JP | 2010-085515 A | 4/2010 |

OTHER PUBLICATIONS

Office Action issued for counterpart Japanese Application 2013-020975, issued by the Japan Patent Office on Oct. 25, 2013.

* cited by examiner

*Primary Examiner* — Michael Lee
*Assistant Examiner* — Jean W Desir

(57) ABSTRACT

To detect whether an FRC process is performed, provided is an image processing apparatus including an earlier frame movement region detecting means that detects an earlier frame movement region in an earlier frame; a later frame movement region detecting means that detects a later frame movement region in a later frame that is positioned after the earlier frame; a determining means that, when a shift between the earlier frame movement region and the later frame movement region is less than or equal to a region shift threshold value, determines that a frame rate control process is being performed and outputs a parameter change command for changing a threshold value of an image processing parameter; and an image processing means that, upon receiving the parameter change command, changes the threshold value of the image processing parameter.

17 Claims, 16 Drawing Sheets

IMAGE PROCESSING APPARATUS, FRAME RATE CONTROL PROCESS DETERMINATION APPARATUS, AND METHOD

The contents of the following patent applications are incorporated herein by reference: No. 2013-020975 filed on Feb. 6, 2013 and No. PCT/JP2013/073088 filed on Aug. 29, 2013.

BACKGROUND

1. Technical Field

The present invention relates to an image processing apparatus that is capable of determining a frame rate control process, particularly to detecting a frame rate control process.

2. Related Art

Patent Document 1 (see FIG. 19) discloses a moving image region detection process that includes detecting a moving image region in a portion of a single screen.

Patent Document 2 discloses a frame rate control process (referred to below as an "FRC process") as a gradation display driving method of a liquid crystal display apparatus. This FRC process includes pseudo-displaying of an intermediate adjusted luminance by displaying different gradation luminance in each frame in an alternating manner.

PRIOR ART DOCUMENTS

Patent Documents

Patent Document 1: Japanese Patent No. 4980486
Patent Document 2: Japanese Patent Application Publication No. 2002-287709

SUMMARY OF THE INVENTION

Problems to be Solved by the Invention

In an image that has undergone the above FRC process, when the moving image region detection is performed, there is a concern that still image regions will be incorrectly detected as moving image regions. This is because, according to the above FRC process, the pixel value changes in each frame even in portions that are still image regions.

This problem occurs not only in cases where moving image regions and still image regions are mixed, but also in cases where image processing is performed as post-processing after the FRC process, as described below.

For example, in a case where a region is identified as a text region and edge enhancement or the like is performed on regions other than text regions, it is necessary to detect text regions that are not image regions within the screen. In this case, when using the above FRC process, there is a concern that text regions will be detected as moving image regions, i.e. image regions.

Furthermore, when a noise elimination process is performed after the FRC process, there is a concern that the change in pixel values caused by the FRC process will be detected as noise and eliminated.

It is an objective of the present embodiment to solve the above problems and provide an FRC process determination apparatus that is capable of determining whether the FRC process is performed and performing image processing as post-processing using results of the determination. Furthermore, it is an objective of the present invention to provide an image processing apparatus that performs image processing using the detection results of the FRC process performed.

SUMMARY (1) According to the present invention, provided is an image processing apparatus comprising an earlier frame movement region detecting means that detects an earlier frame movement region in an earlier frame; a later frame movement region detecting means that detects a later frame movement region in a later frame that is positioned after the earlier frame; a determining means that, when a shift between the earlier frame movement region and the later frame movement region is less than or equal to a region shift threshold value, determines that a frame rate control process is being performed and outputs a parameter change command for changing a threshold value of an image processing parameter; and an image processing means that, upon receiving the parameter change command, changes the threshold value of the image processing parameter. In this way it is possible to determine whether a frame rate control process is performed by using the region shift of movement regions, and to perform suitable image processing as post-processing after the frame rate control process.

(2) In the image processing apparatus of the present embodiment, the determining means determines that the frame rate control process is being performed when the shift determination is made repeatedly a plurality of times for continuous frames. Accordingly, accurate determinations can be made even when there is noise.

(3) In the image processing apparatus of the present embodiment, each frame movement region is formed by blocks that are each formed by a plurality of pixels. Accordingly, the frame memory is not necessary.

(4) In the image processing apparatus of the present embodiment, the image processing means is a rectangular movement region determining means that, upon receiving the parameter change command, performs the change by increasing the threshold value of an image processing parameter for determining a movement region. Accordingly, even when the frame rate control process is performed, it is then possible to suitably perform the rectangular movement region detection process.

(5) In the image processing apparatus of the present embodiment, the image processing means is a text region determining means that, upon receiving the parameter change command, performs the change by decreasing the threshold value of an image processing parameter for determining a text region. Accordingly, even when the frame rate control process is performed, it is then possible to suitably perform the text region detection process.

(6) In the image processing apparatus of the present embodiment, the image processing means is a noise eliminating means that, upon receiving the parameter change command, performs the change by increasing the threshold value of an image processing parameter for determining noise. Accordingly, even when the frame rate control process is performed, it is then possible to suitably perform the noise elimination process.

(7) According to the present invention, provided is a rectangular movement region detection apparatus including a rectangular movement region detecting means that detects a rectangular movement region upon receiving image data of each of a plurality of frames, the rectangular movement region detection apparatus comprising a determining means that detects an earlier frame rectangular movement region in an earlier frame and a later frame rectangular movement region in a later frame that is positioned after the earlier frame and, when a shift between the earlier frame rectangular movement region and the later frame rectangular movement region is less than or equal to a region shift threshold value, determines that a frame rate control process is being performed and outputs a parameter change command for changing a threshold value of an image processing parameter; and a data providing means that provides the determining means with the image data for a portion of frames among the plurality of frames. Detection of frame movement regions by the determining means is performed with greater accuracy than a rectangular movement region determination by the rectangular movement region detecting means. Accordingly, it is possible to detect the fame rate control process without increasing the computational processing load for the rectangular region process in the post-processing.

(8) According to the present invention, provided is a frame rate control process detection apparatus comprising a frame rectangular movement region detecting means that detects a frame rectangular movement region in each of a plurality of frames upon receiving image data of the plurality of frames; and a determining means that, when a shift between an earlier frame rectangular movement region of an earlier frame detected by the frame rectangular movement region detecting means and a later frame rectangular movement region in a later frame that is positioned after the earlier frame is less than or equal to a region shift threshold value, determines that a frame rate control process is being performed and outputs a parameter change command for changing a threshold value of an image processing parameter. In this way, it is possible to determine whether the frame rate control process is performed by using the region shift of the movement regions.

In this Specification, the terms "earlier frame" and "later frame" obviously include frames that are continuous, and may also include any frames that are have a before and after relationship with each other. The "frame rate control process" includes at least all types of temporal frame rate control processes.

DESCRIPTION OF EXEMPLARY EMBODIMENTS

Hereinafter, some embodiments of the present invention will be described with references to the drawings.

1.1 Function Blocks

Figure 1:
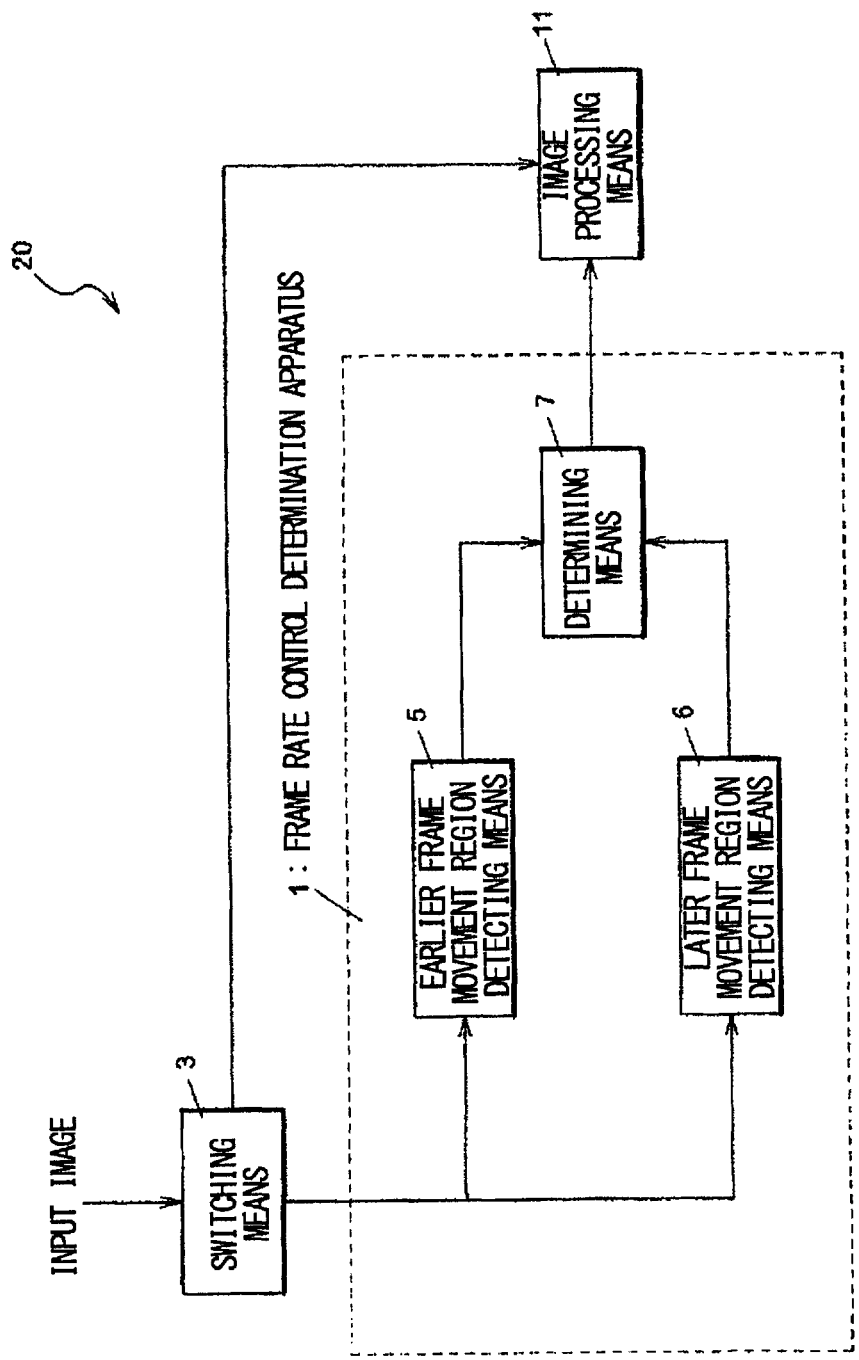
FIG. 1 shows function blocks of the image processing apparatus 20.

FIG. 1 shows function blocks of an image processing apparatus 20 including a frame rate control process (referred to below as an "FRC process") determination apparatus 1 according to a first embodiment of the present invention. The image processing apparatus 20 includes the FRC process determination apparatus 1, a switching means 3, and an image processing means 11.

The FRC process determination apparatus 1 includes an earlier frame movement region detecting means 5, a later frame movement region detecting means 6, and a determining means 7. The earlier frame movement region detecting means 5 detects an earlier frame movement region in an earlier frame. The later frame movement region detecting means 6 detects a later frame movement region in a later frame that is positioned after the earlier frame. The determining means 7 determines that the frame rate control process is performed if the shift between the earlier frame movement region and the later frame movement region is less than or equal to a region shift threshold value, and outputs a parameter change command to change a threshold value of an image processing parameter.

The switching means 3 provides the FRC process determination apparatus 1 with a portion of the frames of an input image, and provides the image processing means 11 with the remaining frames of the input image. Upon receiving the parameter change command, the image processing means changes the threshold value of the image processing parameter and performs image processing of the input image provided thereto.

1.2 Hardware Configuration

Figure 2:
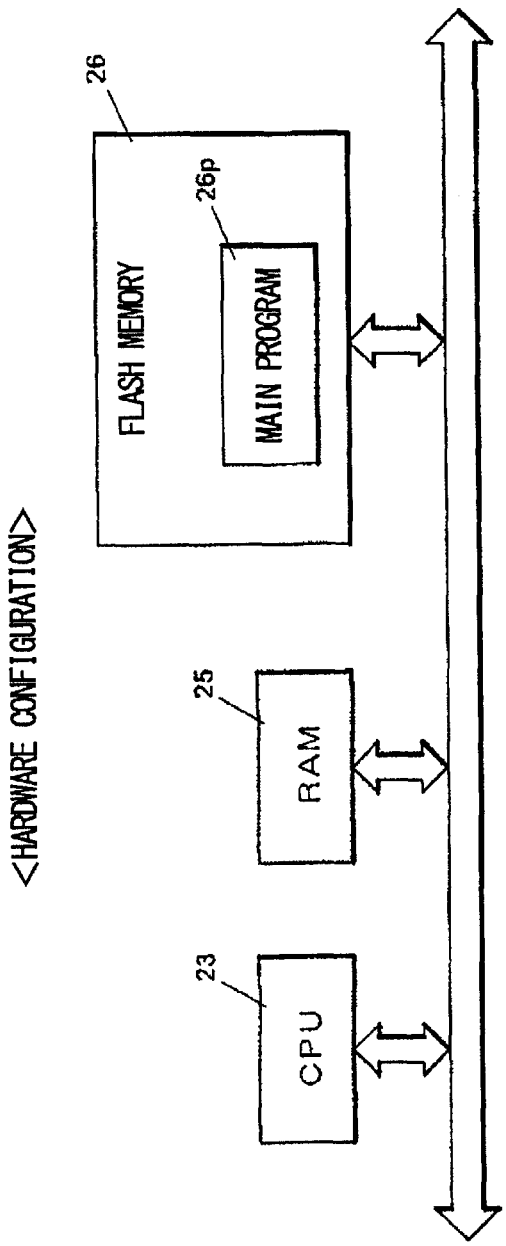
FIG. 2 shows an exemplary hardware configuration in a case where the image processing apparatus 20 is formed using a CPU.

FIG. 2 shows a hardware configuration of the image processing apparatus 20. The image processing apparatus 20 includes a CPU 23, a RAM 25, and a flash memory 26. The flash memory 26 stores a program 26p. The program 26p stores a program that receives the FRC process determination and the determination results and performs image process, as described further below. The RAM 25 stores computational results and the like.

The CPU 23 determines whether the FRC process is performed based on the pixel values forming the display region stored in memory and stores the results in the RAM 25, according to the program 26p.

1.3 Description of the Flow Chart

The following describes a case in which a rectangular movement region is detected, as the image process performed by the image processing means 11 (see FIG. 1).

Figure 3:
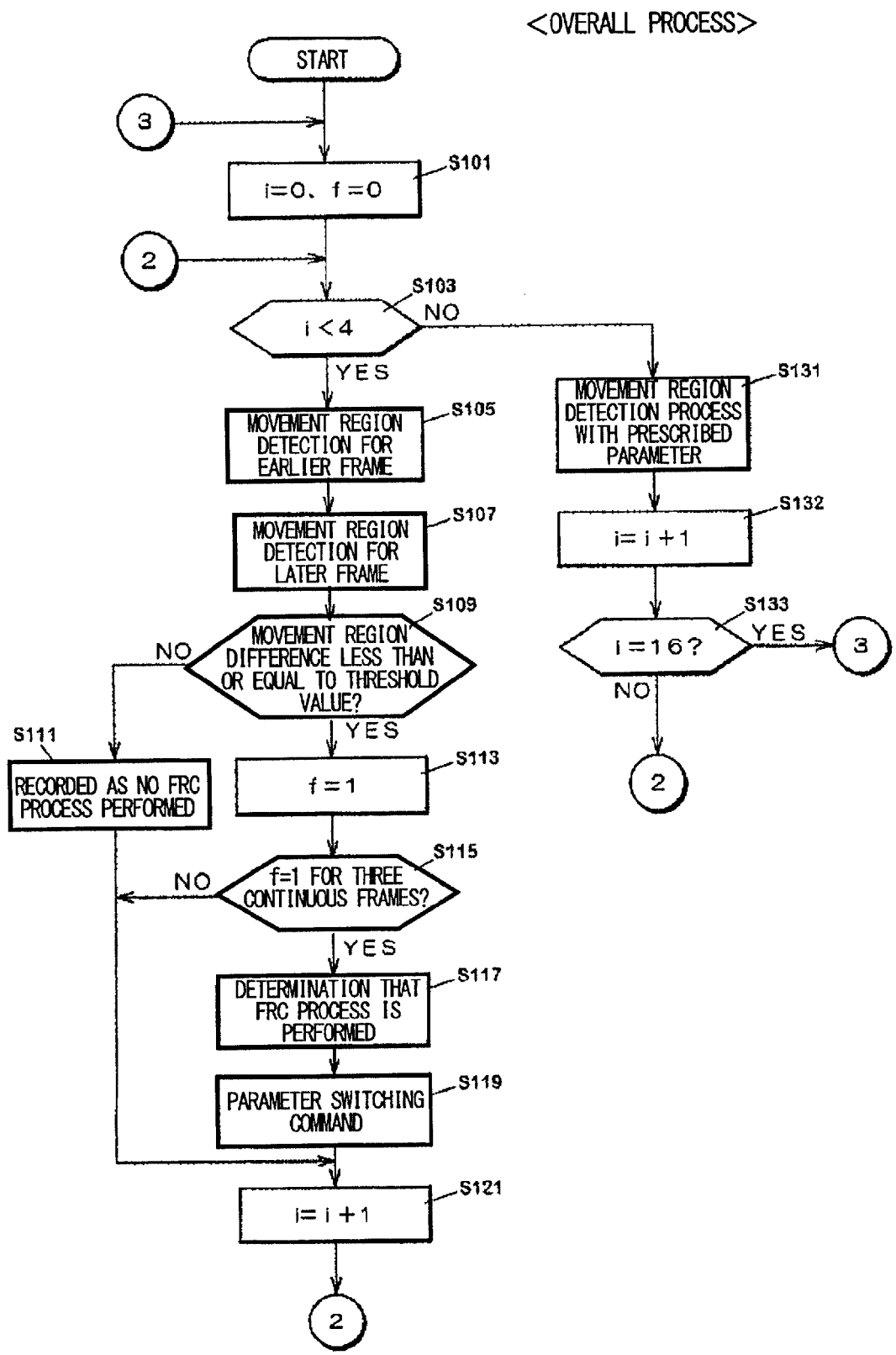
FIG. 3 is an overall flow chart.
Figure 4:
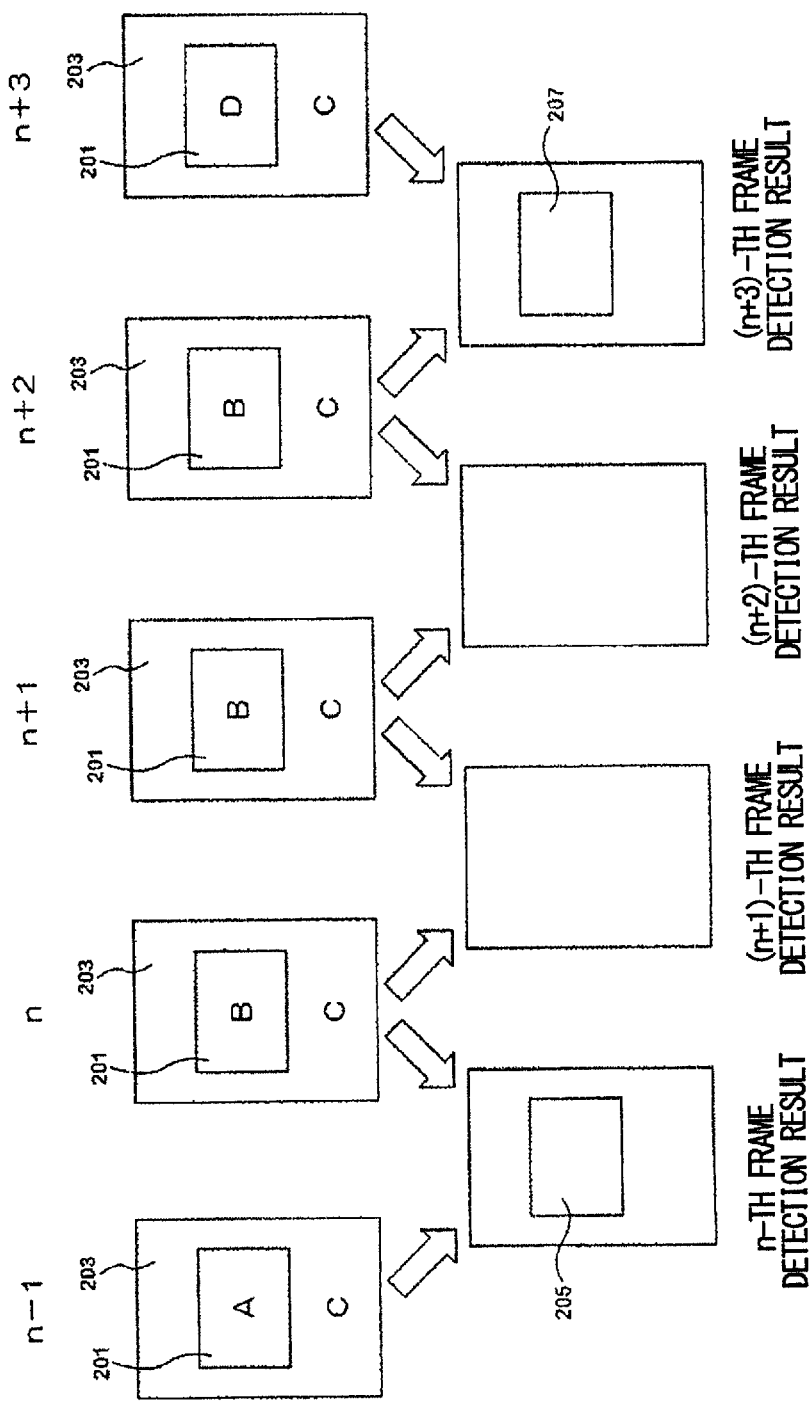
FIG. 4 shows the detection results in a case where the FRC process is not performed.

The process performed according to the program 26*p* shown in FIG. 2 is described using FIG. 3. As shown in FIG. 4, the following describes a case in which the background section 203 is a still image C, there is a rectangular moving image region 201 in a portion of one frame, and in order to display moving image data with a frame rate of 16 FPS in a monitor at 60 FPS, among the (n−1)-th frame to the (n+3)-th frame, an image that is the same as the n-th frame is inserted as the (n+1)-th frame and the (n+2)-th frame. The following describes an example in which the FRC process is not performed under the above conditions, and an example in which the FRC process is performed under the above conditions.

(1.3.1 Case in which the FRC Process is not Performed)

FIG. 4 is used to describe a case in which the FRC process is not performed.

The CPU 23 initializes a processing frame number i and an FRC process candidate flag f (step S101 in FIG. 3). The CPU 23 determines whether the processing frame number i satisfies the condition of i<4 (step S103). In this case, i=0, and therefore the movement region is detected for the earlier frame (step S105). The detection of the movement region in each frame may be performed using a known detection technique. In the present embodiment, the rectangular movement region detection technique described further below is used. As shown in FIG. 4, the movement region 205 is obtained as the n-th frame detection result from the (n−1)-th frame and the n-th frame.

Next, the CPU 23 detects the movement region of the later frame (step S107 in FIG. 3). The detection method is the same as used in step S103. In this case, the n-th frame and the (n+1)-th frame are the same frame image, and therefore the difference therebetween is zero. Accordingly, a movement region is not detected.

The CPU 23 determines whether the difference between the movement region of the earlier frame and the movement region of the later frame is less than or equal to a threshold value (step S109). This determination is made by determining whether the shift between the boundary lines of the movement regions in the n-th frame detection result and the (n+1)-th frame detection result is less than or equal to a threshold value. In other words, this determination is made based on the shifts in position and the sizes of the movement regions.

In this case, there is no movement region in the (n+1)-th frame detection result, and therefore the CPU 23 determines that the difference is greater than the threshold value. The CPU 23 stores information indicating that there is no FRC process (step S111), increments the processing frame number i (step S121), and repeats the steps from step S103 onward.

The CPU 23 determines whether the processing frame number i satisfies the condition of i<4 (step S103). In this case, i=1, and therefore a movement region is detected in the earlier frame (step S105). In this case, as shown in FIG. 4, the n-th frame and the (n+1)-th frame are the same frame image, and therefore the difference therebetween is zero. Accordingly, a movement region is not detected.

Next, the CPU 23 detects the movement region of the later frame (step S107 in FIG. 3). In this case, the (n+1)-th frame and the (n+2)-th frame are the same frame image, and therefore the difference therebetween is zero. Accordingly, a movement region is not detected.

The CPU 23 determines whether the difference between the movement region of the earlier frame and the movement region of the later frame is less than or equal to the threshold value (step S109). In this case, there is no movement region, and therefore the difference is zero.

Accordingly, the CPU 23 sets the FRC process candidate flag f such that f=1 for this detection result (step S113). The CPU 23 determines whether the FRC process candidate flag f has been f=1 continuously for three frames (step S115). In this case, the FRC process candidate flag f has not been f=1 continuously for three frames. Accordingly, the CPU 23 increments the processing frame number i (step S121) and repeats the steps from step S103 onward.

The CPU 23 determines whether the processing frame number i satisfies the condition of i<4 (step S103). In this case, i=2, and therefore the CPU 23 detects a movement region in the earlier frame (step S105). In this case, as shown in FIG. 4, the (n+1)-th frame and the (n+2)-th frame are the same frame image, and therefore the difference therebetween is zero. Accordingly, a movement region is not detected.

Next, the CPU 23 detects the movement region of the later frame (step S107). In this case, as shown in FIG. 4, the movement region 207 is obtained from the (n+2)-th frame and the (n+3)-th frame. This is because the background section is the same still image C, but the rectangular moving image region 201 is different in images B and D.

The CPU 23 determines whether the difference between the movement region of the earlier frame and the movement region of the later frame is less than or equal to the threshold value (step S109). In this case, there is no movement region in the earlier frame, and therefore the difference between the movement regions exceeds the threshold value. Accordingly, the CPU 23 stores that there is no FRC process performed (step S111), increments the processing frame number i (step S121), and repeats the steps from step S103 onward.

The CPU 23 determines whether the processing frame number i satisfies the condition of i<4 (step S103). In this case, i=3, and therefore the processes of steps S105 to S121 are performed in the same manner.

The CPU 23 determines whether the processing frame number i satisfies the condition of i<4 (step S103). In this case, i=4, and therefore the CPU 23 performs image processing with a prescribed parameter (step S131). The CPU 23 increments the processing frame number i (step S132) and determines whether the processing frame number i fulfils the condition i=16 (step S133). In this case, i=5, and therefore the process returns to step S103 and the processes from steps S131 to S133 are repeated.

The processing is repeated in this manner up to and including i=15, and then when the processing frame number i fulfils the condition of i=16, the process returns to step S101 from step S133.

In this way, a case in which the FRC process is not performed is determined.

(1.3.2 Case in which the FRC Process is Performed)

Figure 5:
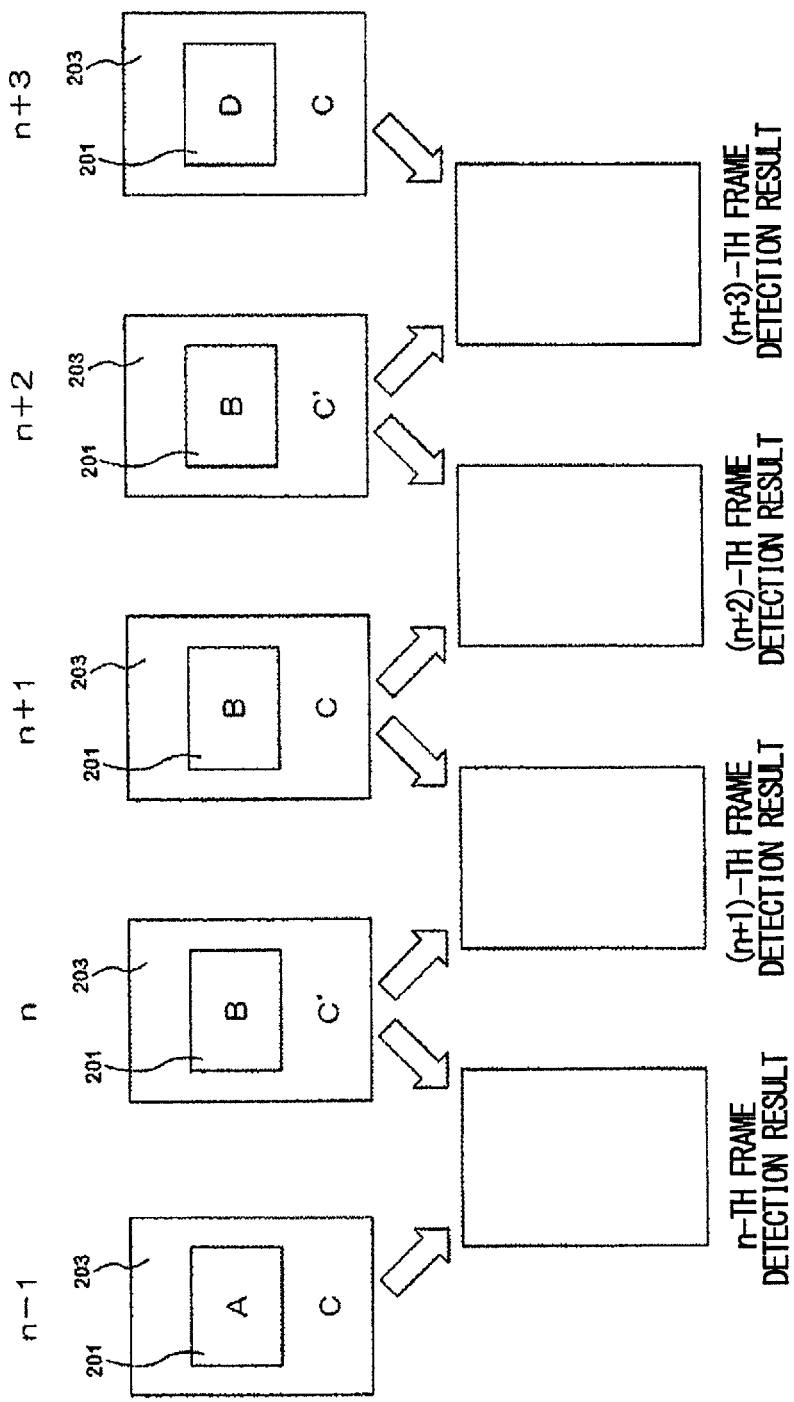
FIG. 5 shows the detection results in a case where the FRC process is performed.

The following describes a case in which the FRC process is performed, using FIGS. 3 and 5. In this description, the FRC processes changes the pixel values of the necessary pixels in the n-th frame and the (n+2)-th frame.

The CPU 23 initializes a processing frame number i and an FRC process candidate flag f (step S101). The CPU 23 determines whether the processing frame number i satisfies the condition of i<4 (step S103). In this case, i=0, and therefore a movement region is detected for the earlier frame (step S105). In a case where the FRC process is performed, the (n−1)-th frame and the n-th frame are different from each other regardless of the background section 203 being a still image such as shown in FIG. 5. As a result of the FRC process, the movement region 201 is different in the (n−1)-th frame than in the n-th frame. Accordingly, in the n-th frame detection result obtained from the (n−1)-th frame and the n-th frame, the entire screen is detected as the movement region.

Next, the CPU 23 detects the movement region in the later frame (step S107). In this case, the n-th frame and the (n+1)-th frame are the same frame image, but are all different due to the FRC processing being performed. Accordingly, in the (n+1)-th frame detection result obtained from the n-th frame and the (n+1)-th frame, the entire screen is detected as the movement region.

The CPU 23 determines whether the difference between movement regions is less than or equal to the threshold value (step S109). In this case, the entire screen is the movement region in both frames. Accordingly, the difference between the movement regions is zero, and therefore the CPU 23 determines that the difference is less than the threshold value and sets the FRC process candidate flag f to be f=1 (step S113). The CPU 23 determines whether the FRC process candidate flag f has been f=1 continuously for three frames (step S115). In this case, the FRC process candidate flag f has not been f=1 continuously for three frames, and therefore the CPU 23 increments the processing frame number i (step S121) and repeats the steps from step S103 onward.

The CPU 23 determines whether the processing frame number i satisfies the condition of i<4 (step S103). In this case, i=1, and therefore movement region is detected for the earlier frame (step S105). In this case, as shown in FIG. 5, the n-th frame and the (n+1)-th frame are the same frame image, but are all different due to the FRC processing being performed. Accordingly, in the (n+1)-th frame detection result obtained from the n-th frame and the (n+1)-th frame, the entire screen is detected as the movement region.

Next, the CPU 23 detects the movement region in the later frame (step S107). In this case, as shown in FIG. 5, the (n+1)-th frame and the (n+2)-th frame are the same frame image, but are all different due to the FRC processing being performed. Accordingly, in the (n+2)-th frame detection result obtained from the (n+1)-th frame and the (n+2)-th frame, the entire screen is detected as the movement region.

The CPU 23 determines whether the difference between movement regions is less than or equal to the threshold value (step S109). In this case, the entire screen is the movement region in both frames. Accordingly, the difference between the movement regions is zero, and therefore the CPU 23 determines that the difference is less than the threshold value.

The CPU 23 sets the FRC process candidate flag f for this detection result to be f=1 (step S113). The CPU 23 determines whether the FRC process candidate flag f has been f=1 continuously for three frames (step S115). In this case, the FRC process candidate flag f has been f=1 continuously for only two frames, and therefore has not been f=1 continuously for three frames. Accordingly, the CPU 23 increments the processing frame number i (step S121) and repeats the steps from step S103 onward.

The CPU 23 determines whether the processing frame number i satisfies the condition of i<4 (step S103). In this case, i=2, and therefore a movement region is detected for the earlier frame (step S105). In this case, as shown in FIG. 5, the (n+1)-th frame and the (n+2)-th frame are the same frame image, but are all different due to the FRC processing being performed. Accordingly, in the (n+2)-th frame detection result obtained from the (n+1)-th frame and the (n+2)-th frame, the entire screen is detected as the movement region.

Next, the CPU 23 detects the movement region in the later frame (step S107). In this case, as shown in FIG. 5, in the (n+2)-th frame and the (n+3)-th frame, the FRC process is performed on the background section 203 and the movement regions 201 are different. Accordingly, in the (n+3)-th frame detection result obtained from the (n+2)-th frame and the (n+3)-th frame, the entire screen is detected as the movement region.

The CPU 23 determines whether the difference between movement regions is less than or equal to the threshold value (step S109). In this case, the entire screen is the movement region in both frames. Accordingly, the difference between the movement regions is zero, and therefore the CPU 23 determines that the difference is less than the threshold value.

The CPU 23 sets the FRC process candidate flag f for this detection result to be f=1 (step S113). The CPU 23 determines whether the FRC process candidate flag f has been f=1 continuously for three frames (step S115). In this case, the FRC process candidate flag f has been f=1 continuously for three frames, and therefore the CPU 23 determines that the FRC process is performed (step S117). After this detection process, the CPU 23 switches a parameter of the image processing being performed, specifically switching the detection threshold value of the movement region to be higher (step S119).

The CPU 23 increments the processing frame number i (step S121) and repeats the steps from step S103 onward. The CPU 23 determines whether the processing frame number i satisfies the condition of i<4 (step S103). In this case, i=3, and therefore the processes of steps S105 to S121 are performed in the same manner as described above.

The CPU 23 determines whether the processing frame number i satisfies the condition of i<4 (step S103). In this case, i=4, and therefore the CPU 23 performs the movement detection process with the parameter increased at step S119 (step S131). After this, the processing is the same as in the case where the FRC process is not performed.

In this way, a total of four frames, i.e. the 0-th frame to the 3rd frame, among 16 frames are used to determine whether an FRC process is performed according to whether there is a difference between movement regions of an earlier frame and a later frame, and in a case where the FRC process is performed, a parameter is changed for the remaining 12 frames in a manner to increase the detection threshold value for the movement region detection. As a result, it is possible to accurately detect the movement region even when the FRC process is performed.

(1.3.3 Rectangular Movement Region Determination Process)

The following describes the rectangular movement region determination technique (steps S105 and S107 in FIG. 3) in the FRC process determination adopted in the present embodiment.

Figure 7:
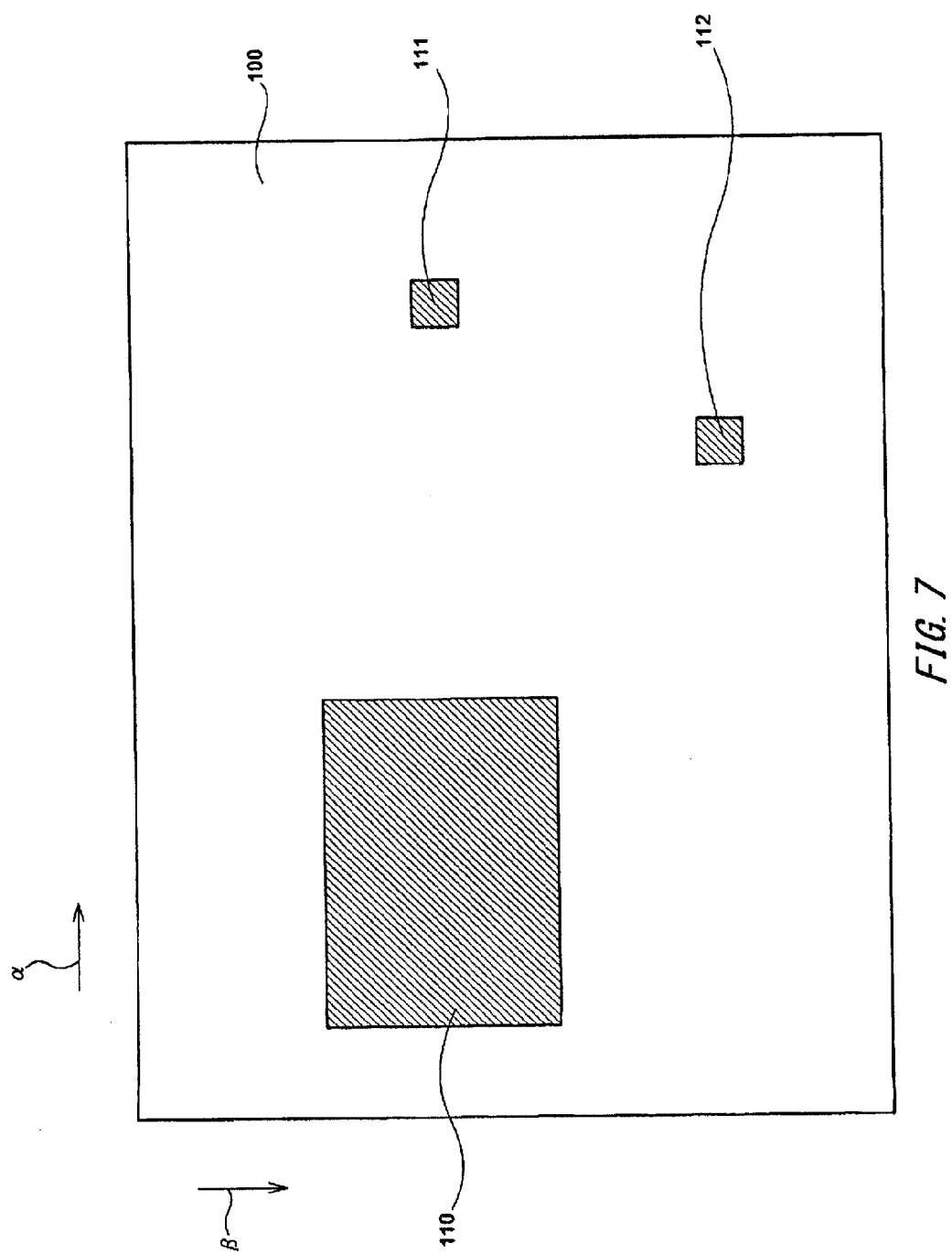
FIG. 7 shows a display region 100 containing the movement image regions 110 to 112.

The following describes an example in which an display region 100, which is one frame of a monitor, includes three rectangular movement image regions 110 to 112, as shown in FIG. 7.

The display region 100 includes pixels arranged in a matrix having a row direction α and a column direction β.

Figure 6:
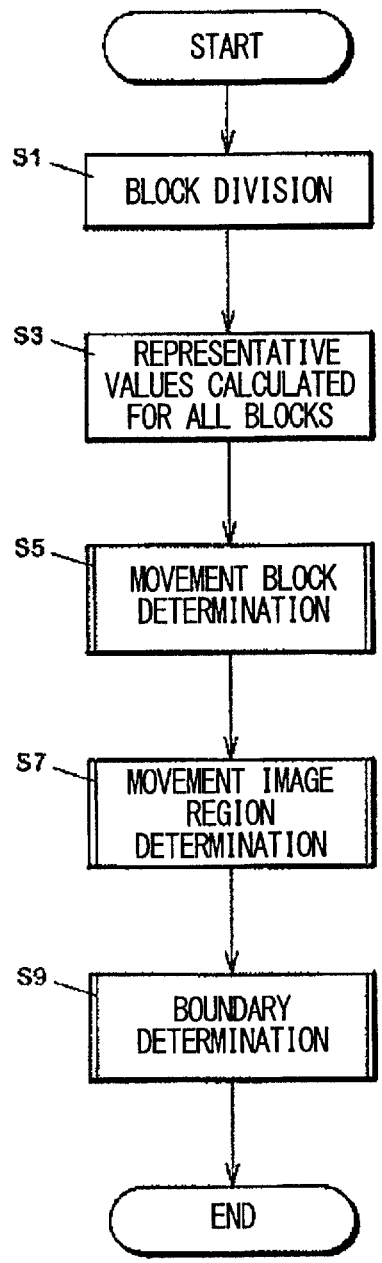
FIG. 6 is a detailed flow chart of the movement image region determination process in steps S105 and S107 of FIG. 3.

The CPU 23 performs block division (step S1 in FIG. 6). In the present embodiment, one block includes a 32×32 arrangement of pixels, and the display region 100 shown in FIG. 7 is divided into a matrix formation including a plurality of these blocks. In the following description, the display region 100 is divided into n+1 blocks in the α direction and m+1 blocks in the β direction.

The CPU 23 determines representative values for all of the blocks (step S3 in FIG. 6). Theses representative values may be the average value of the pixel values in each block, the leading pixel value in each block, or a hash value such as a CRC value of each block that does not directly use the average or leading pixel value. In a 32×32×8-bit image, the average value can be expressed with a length of 18 bits, but a total of 10 bits may be removed from the top and bottom such that only the middle 8 bits are used. In this way, representative values of (n+1)×(m+1) blocks are stored in the RAM 25. Representative values are preferably adopted that are precise enough to enable detection of the FRC process.

The CPU 23 determines movement blocks among the (n+1)×(m+1) blocks (step S5). The movement block determination process is described using FIG. 8.

Figure 8:
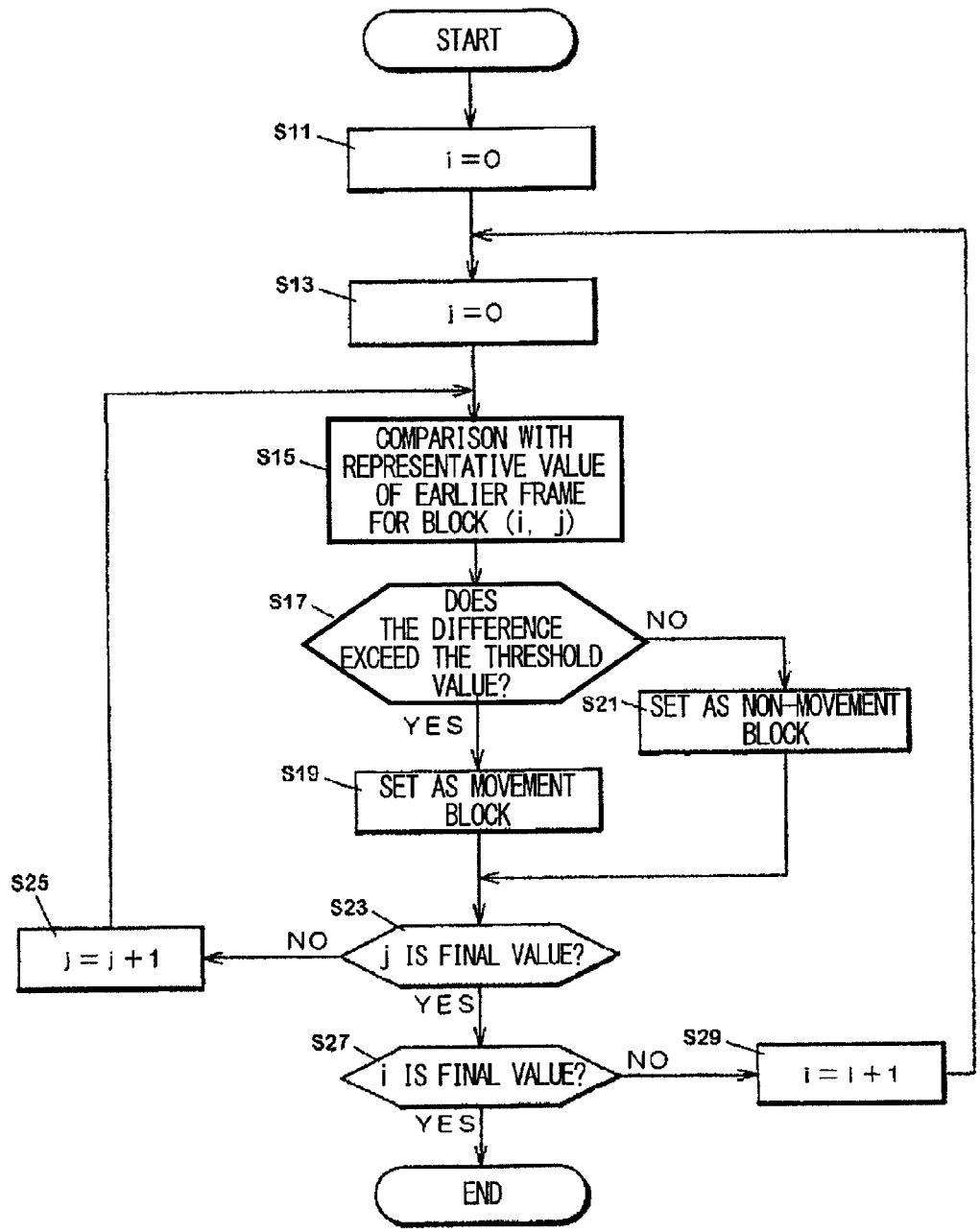
FIG. 8 is a flow chart of the movement block determination process.

The CPU 23 initializes the processing block numbers i, j (steps S11 and S13 in FIG. 8). A comparison to the representative value of the earlier frame is made for block (0, 0) (step S15). In the present embodiment, the representative vales at time t and time t−1 are compared to each other. The CPU 23 determines whether the difference between the representative values exceeds the threshold value thb (step S17) and determines a block to be a movement block if the difference between the representative values exceeds the threshold value tbh (step S19). On the other hand, the CPU 23 determines a block to be a non-movement block if the difference between the representative values does not exceed the threshold value thb (step S21).

The CPU 23 determines whether the processing block number j is the final number (step S23). In this case, j=0, which is not the final number, and therefore CPU 23 increments the processing block number j (step S25) and repeats the process from step S15 onward. At step S23, if the processing block number j is the final number, the process moves to step S27 and the CPU 23 determines whether the processing block number i is the final value. In this case, the processing block number i is not the final value, and therefore the CPU 23 increments the processing block number i (step S29) and repeats the steps from step S13 onward. At step S27, if the processing block number i is the final value, the process ends.

Figure 9:
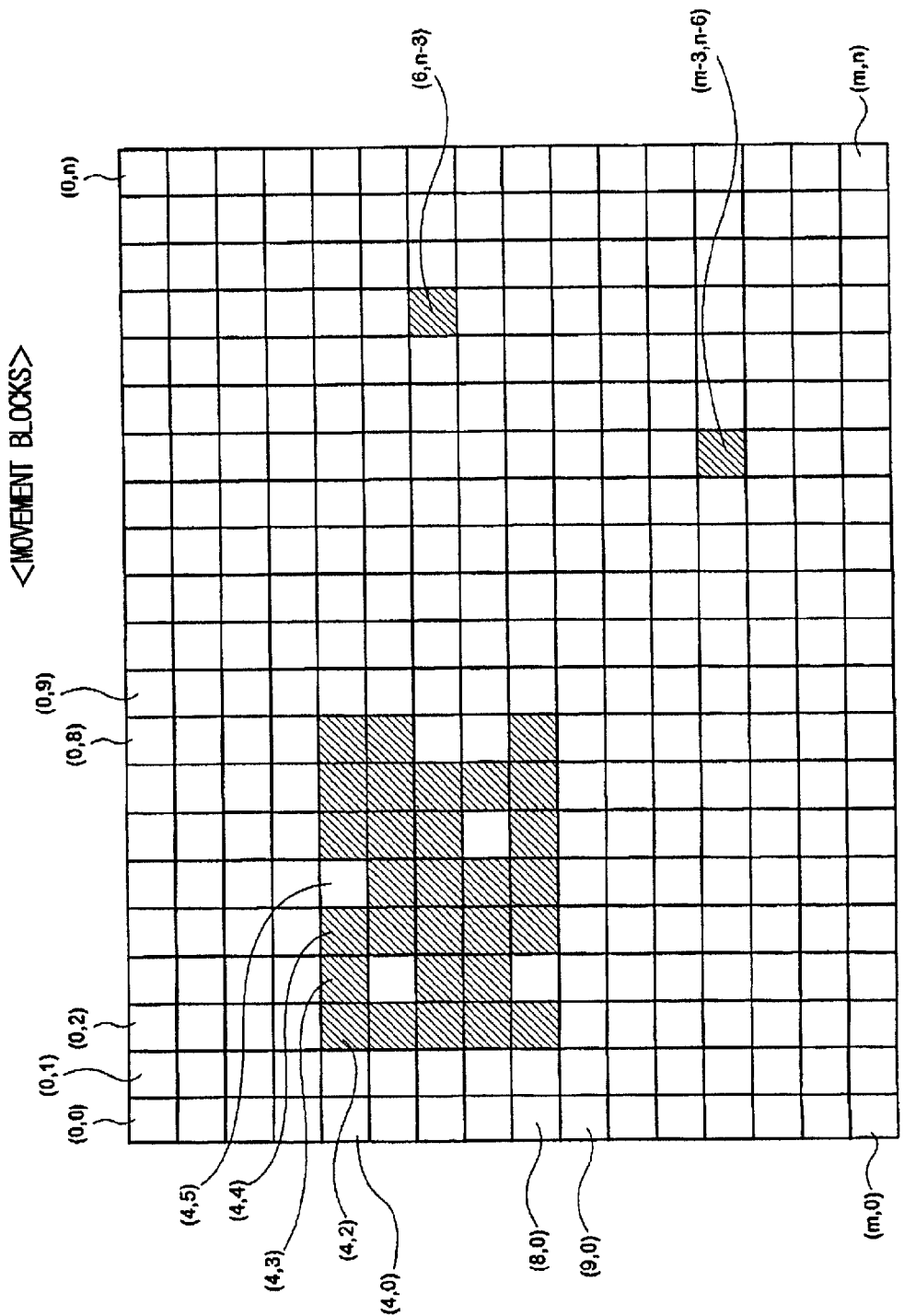
FIG. 9 shows results obtained by detecting the movement blocks.

In this way, movement blocks are determined among the (n+1)×(m+1) blocks as shown in FIG. 9. In this example, blocks (4, 2), (4, 3), (4, 4), etc. are determined to be movement blocks.

The CPU 23 performs the movement image region determination process (step S7 in FIG. 6). The details of the movement image region determination process are described below using FIGS. 10 and 12.

Figure 10:
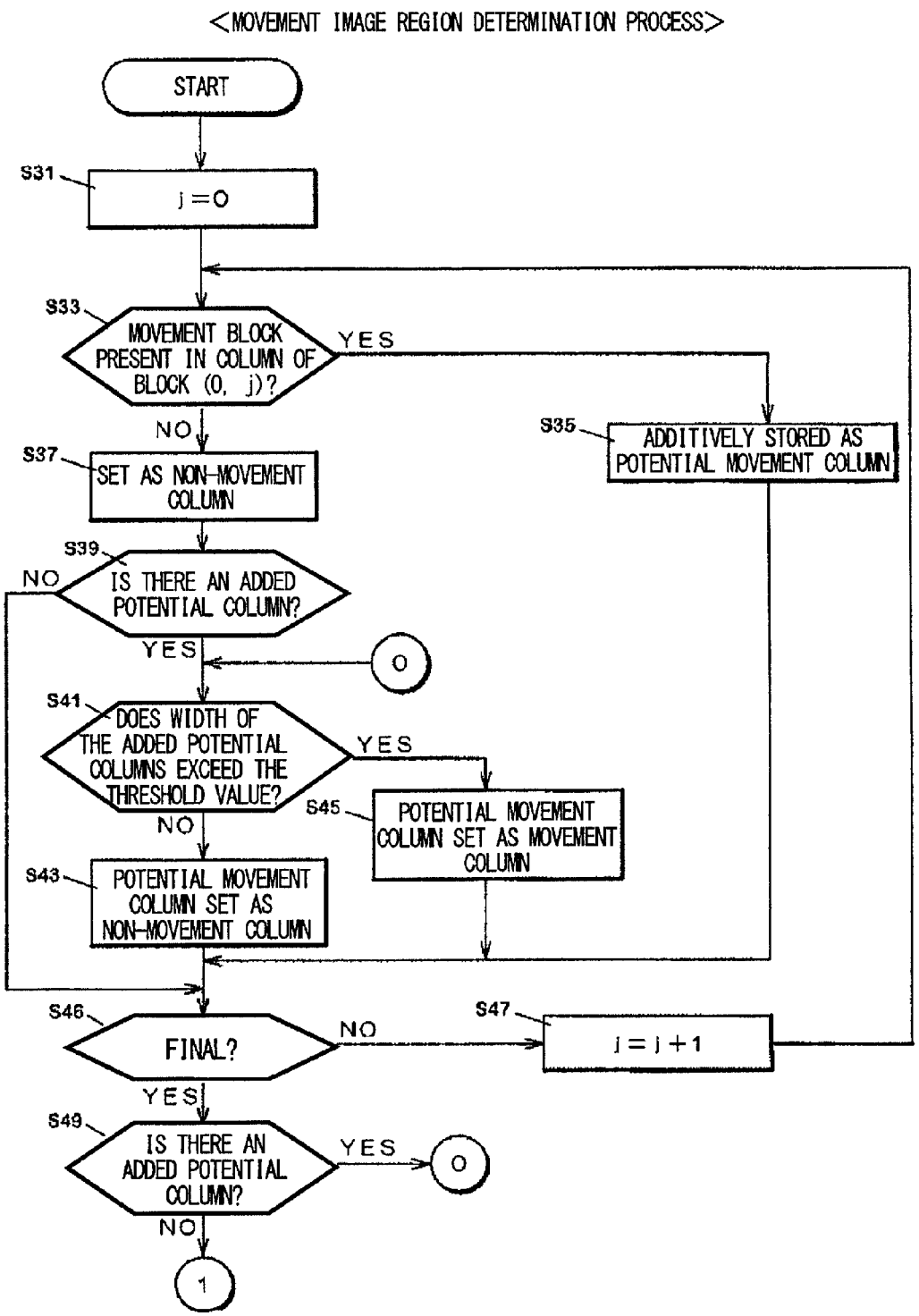
FIG. 10 is a flow chart of the movement image region determination process.

The CPU 23 initializes the processing block number j (step S31 in FIG. 10). The CPU 23 determines whether there is at least one movement block among the blocks in the column associated with block (0, 0) (step S33). In this case, as shown in FIG. 9, there are no movement blocks among block (0, 0) and blocks (1, 0) to (m, 0) in the vertical direction from block (0, 0), and therefore this column is determined to be a non-movement column (step S37 in FIG. 10). The CPU 23 determines whether there is a potential movement column that has been additively stored (step S39). In this case, there is no such potential movement column, and therefore the process proceeds to step S46 and the CPU 23 determines whether the processing block number j is the final number. In this case, j=0, which is not the final number, and therefore the CPU 23 increments the processing block number j (step S47) and repeats the steps from step S33 onward.

When the processing block number j reaches j=2, there is a movement block among the blocks in the vertical direction from the block (0, 2). Accordingly, the CPU 23 additively stores this column as a potential movement column (step S35).

The CPU 23 determines whether the processing block number j is the final number (step S46). In this case, j=2, which is not the final number, and therefore the CPU 23 increments the processing block number j (step S47) and repeats the steps from step 33 onward.

The process of step 35 is repeated up to and including the processing block number j of j=8. For the processing block number j of j=9, there are no movement blocks in the column containing the block (0, 9). Accordingly, the CPU 23 determines that this column is a non-movement column (step S37). The CPU 23 determines whether there is a potential column that has been additively stored (step S39) and, if there is such a potential movement column, determines whether the total grouping of such columns that are adjacent to each other has a width exceeding a threshold value thw (step S41). In the present embodiment, the threshold value thw is set to two blocks. In this case, the potential movement columns that have been additively stored span from block (0,2) to block (0,8), which is a width exceeding the threshold value thw, and therefore these potential movement columns are set as movement columns (step S45).

The CPU 23 determines whether the processing block number j is the final number (step S46).

For the processing block number j of j=10, there are no movement blocks in the column of block (0, 10). Accordingly, the CPU 23 determines that this column is a non-movement column (step S37). The CPU 23 determines whether there is a potential movement column that has been detected (step S39), but there is no such column in this case, and therefore the CPU 23 determines whether the processing block number j is the final number (step S46).

The following columns are determined to be non-movement columns, up to and including j=n−7. For the processing block number j of j=n−6, there is a movement block (m−3, n−6). Accordingly, the CPU 23 additively stores this column as a potential movement column (step S35).

For the processing block number j of j=n−5, there are no movement blocks in the column of block (0, n−5). Accordingly, the CPU 23 determines that this column is a non-movement column (step S37). The CPU 23 determine whether there is a potential movement column that has been detected (step S39) and, if there is such a potential movement column, determines whether the total grouping of such columns that are adjacent to each other has a width exceeding a threshold value thw (step S41). In the present embodiment, the threshold value thw is set to two blocks, which means that the width of this potential movement column does not exceed the threshold value thw, and therefore this potential movement column is set as a non-movement column (step S43). In this way, it is possible to prevent an image region such as a mouse icon from being mistakenly recognized as the movement image region.

The process continues in the same manner, such that a judgment concerning whether a column includes movement blocks is made sequentially one column at a time in the row direction α.

There may be a case where the column of the final block (0, n), which is the final column, is a potential movement column. In such a case, at step S49, the CPU 23 determines whether there is a potential movement column that has been additively stored and, if there is such a potential movement column, performs the processes from step S41 onward.

Figure 11:
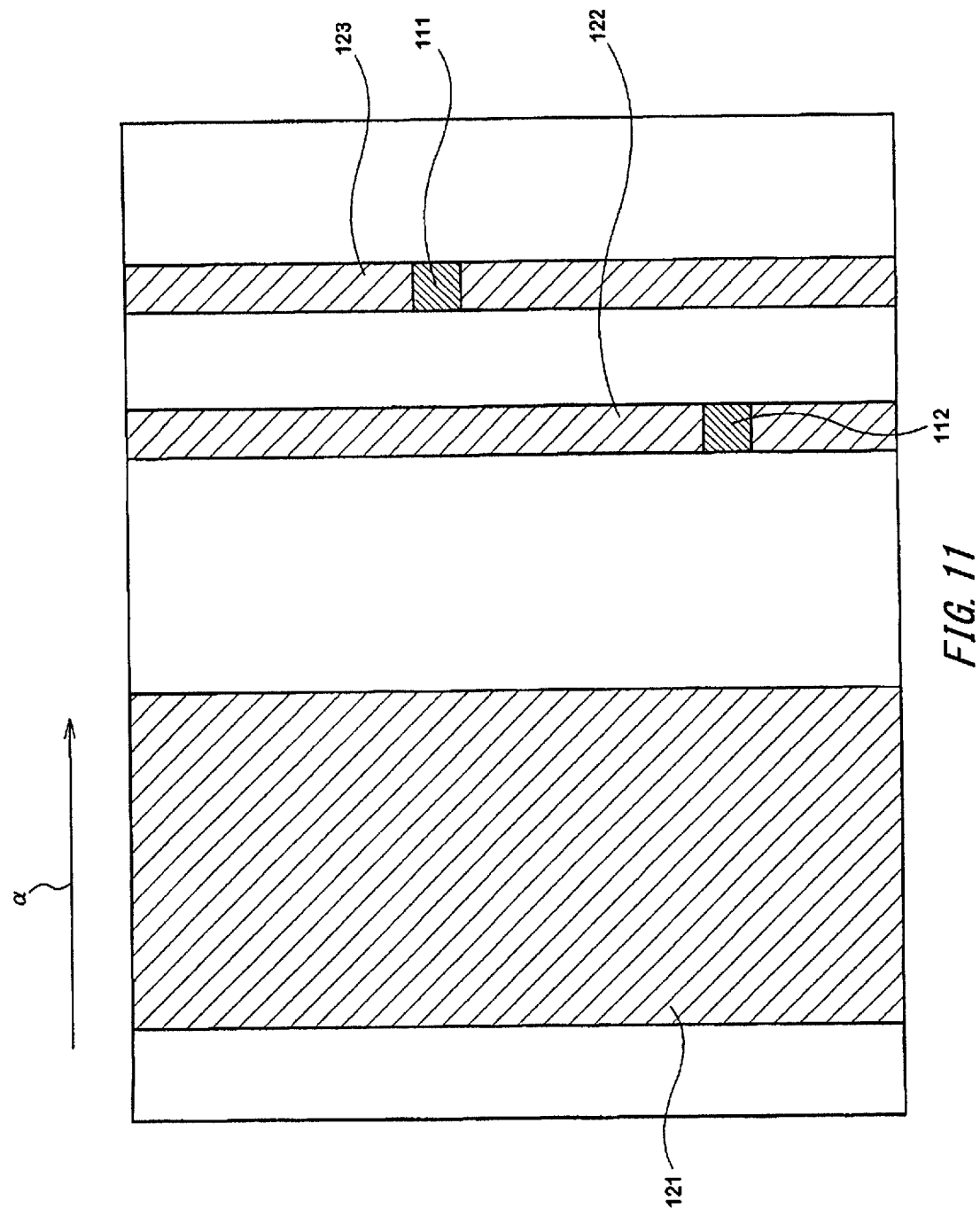
FIG. 11 shows movement column blocks.

FIG. 11 shows the movement columns after detection. In this case, the region 121 is determined to be movement columns. In contrast, the regions 122 and 123 that are associated with the movement blocks (6, n−3) and (m−3, n−6) do not have widths in the direction of the arrow α that are greater than or equal to the threshold value thw, and therefore are not determined to be movement columns.

Figure 12:
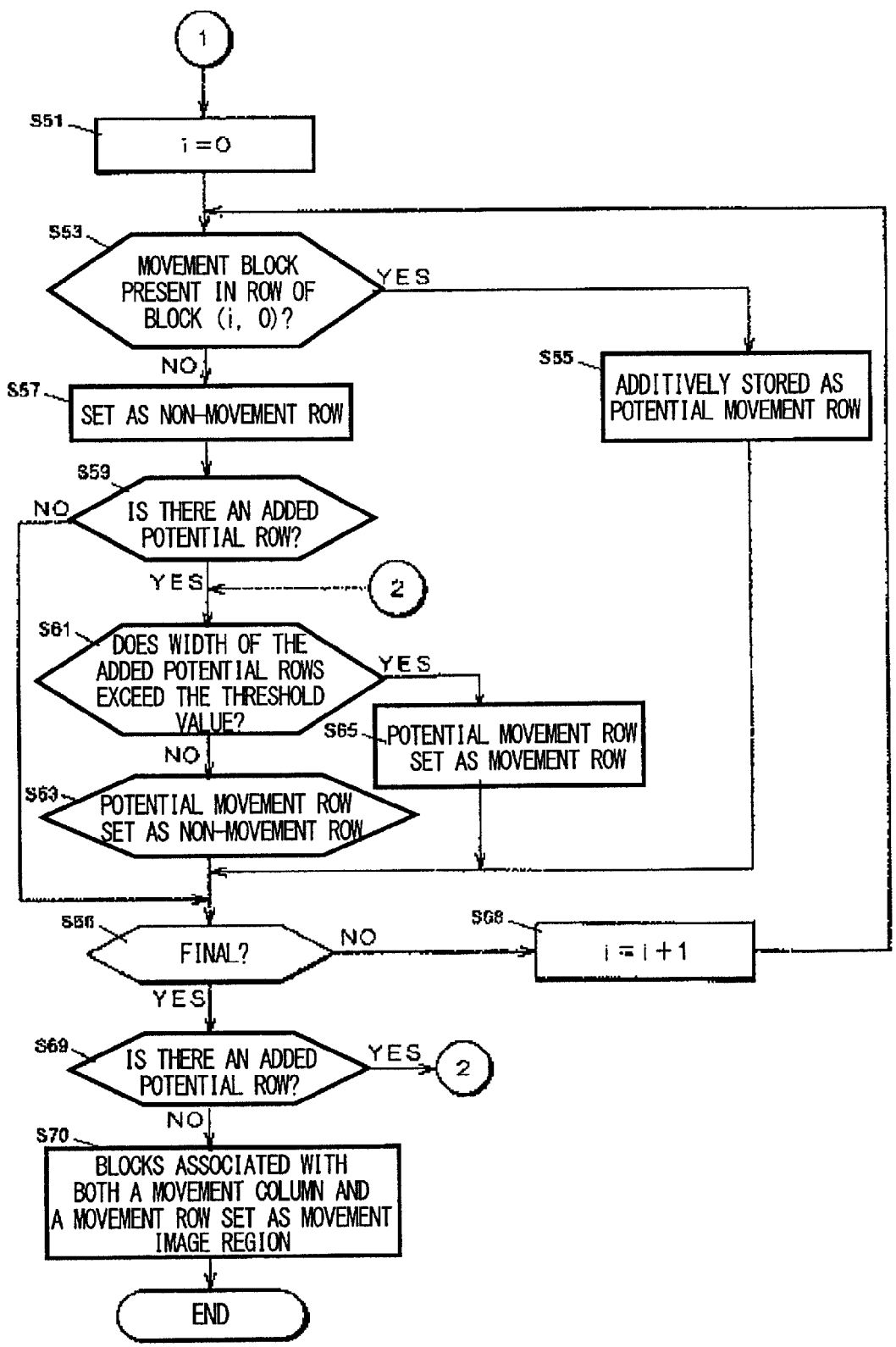
FIG. 12 is a continuation of the flow chart of the movement image region determination process.

Next, the CPU 23 initializes the processing block number i (step S51 in FIG. 12). The CPU 23 determines whether there is at least one movement block in the row of block (0, 0) (step S53). In this case, as shown in FIG. 9, there are no movement blocks among block (0, 0) and blocks (0, 1) to (0, n) in the horizontal direction of block (0, 0), and therefore this row is determined to be a non-movement row (step S57). The CPU 23 determines whether there is a movement row that has been additively stored (step S59). In this case, there are no movement rows that have been detected, and therefore the process proceeds to step S66 and the CPU 23 determines whether the processing block number i is the final value. In this case, i=0, which is not the final number, and therefore the CPU 23 increments the processing block number i (step S68) and repeats the steps from step S53 onward.

For the processing block number i of i=4, there is a movement block in the row of block (4, 0). Accordingly, the CPU 23 additively stores this row as a potential movement row (step S55).

A judgment of a movement row in which there is a movement block in the row of block (i, 0) is made in the same manner for the following rows up to and including i=8. For i=9, there are not movement blocks in the row of block (i, 0), and therefore this row is determined to be a non-movement row (step S57). The CPU 23 determines whether there is an additively stored potential movement row (step S59). In this case, there are additively stored potential movement rows, and therefore the CPU 23 determines whether the grouping of these potential movement rows has a width exceeding the threshold value thw (step S61). In the present embodiment, the threshold value thw is set to two blocks. In this case, the potential movement rows that have been detected span from block (4, 0) to block (8, 0), which is a width exceeding the threshold value thw, and therefore these potential movement rows are set as movement rows (step S65).

The process continues in the same manner, such that a judgment concerning whether a row includes movement blocks is made sequentially one row at a time in the column direction β. The significance of step S69 is the same as that of step S49, and therefore further description is omitted.

Figure 13:
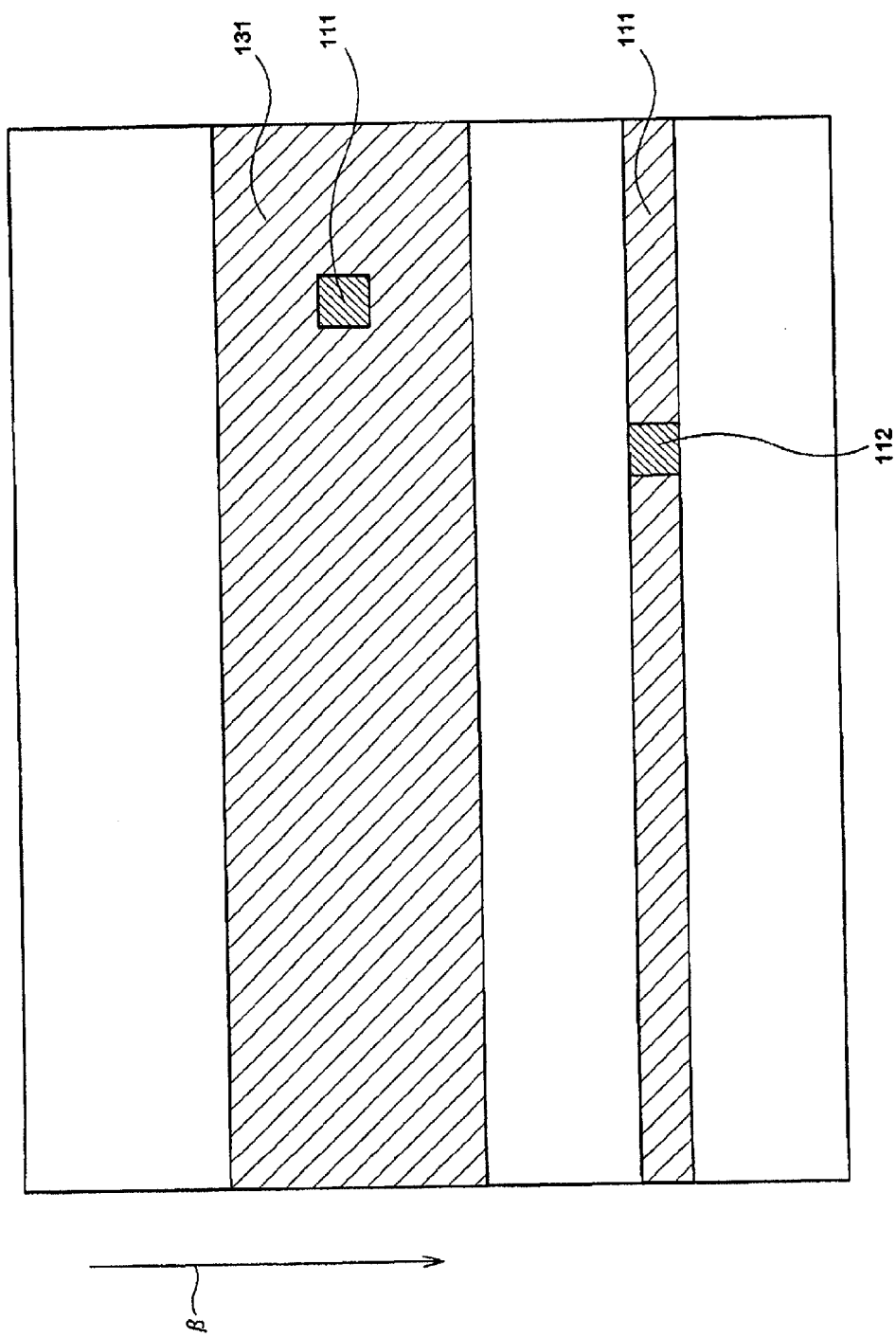
FIG. 13 shows the movement row blocks.

FIG. 13 shows the movement rows after detection. In this case, the region 131 is determined to be movement rows. The movement block (6, n−3) is associated with the region 131. In contrast, the region 132 associated with the movement block (m−3, n−6) does not have a width in the direction of the arrow β that is greater than or equal to the threshold value thw, and therefore is not determined to be a movement row.

Figure 14:
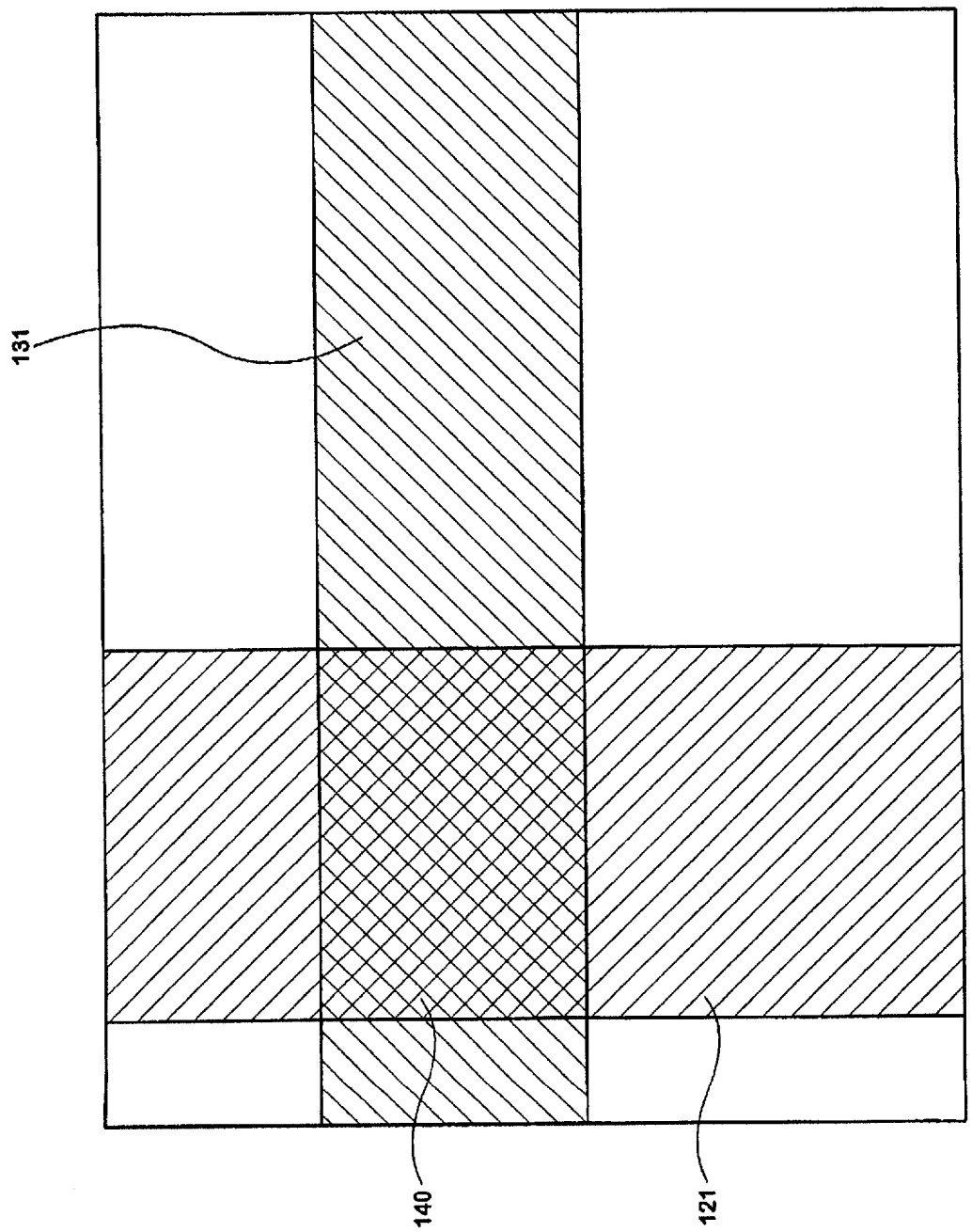
FIG. 14 shows the movement image region 140.

The CPU 23 determines the blocks associated with both a movement column and a movement row to be movement image regions (step S70 in FIG. 12). In this case, the blocks associated with the region 140 shown in FIG. 14 where the regions 121 and the 131 overlap are determined to be the movement image region. Compared to the movement blocks of FIG. 9, the movement blocks (6, n−3) and (m−3, n−6) have been removed, and blocks (4, 5) and the like have been determined to be the movement image region. In this way, it is possible to prevent blocks from being missed due to the relation with surrounding blocks.

The CPU 23 performs the boundary determination process (step S9 of FIG. 6). For the region 140 shown in FIG. 14, a boundary 150 is obtained for the movement image region in blocks each formed by a 32×32 pixel arrangement. According to the process of step S9, it is possible to obtain the boundary of the movement image region in units of 1 pixel, as shown in FIG. 16. The details of step S9 are described using FIG. 15.

Figure 15:
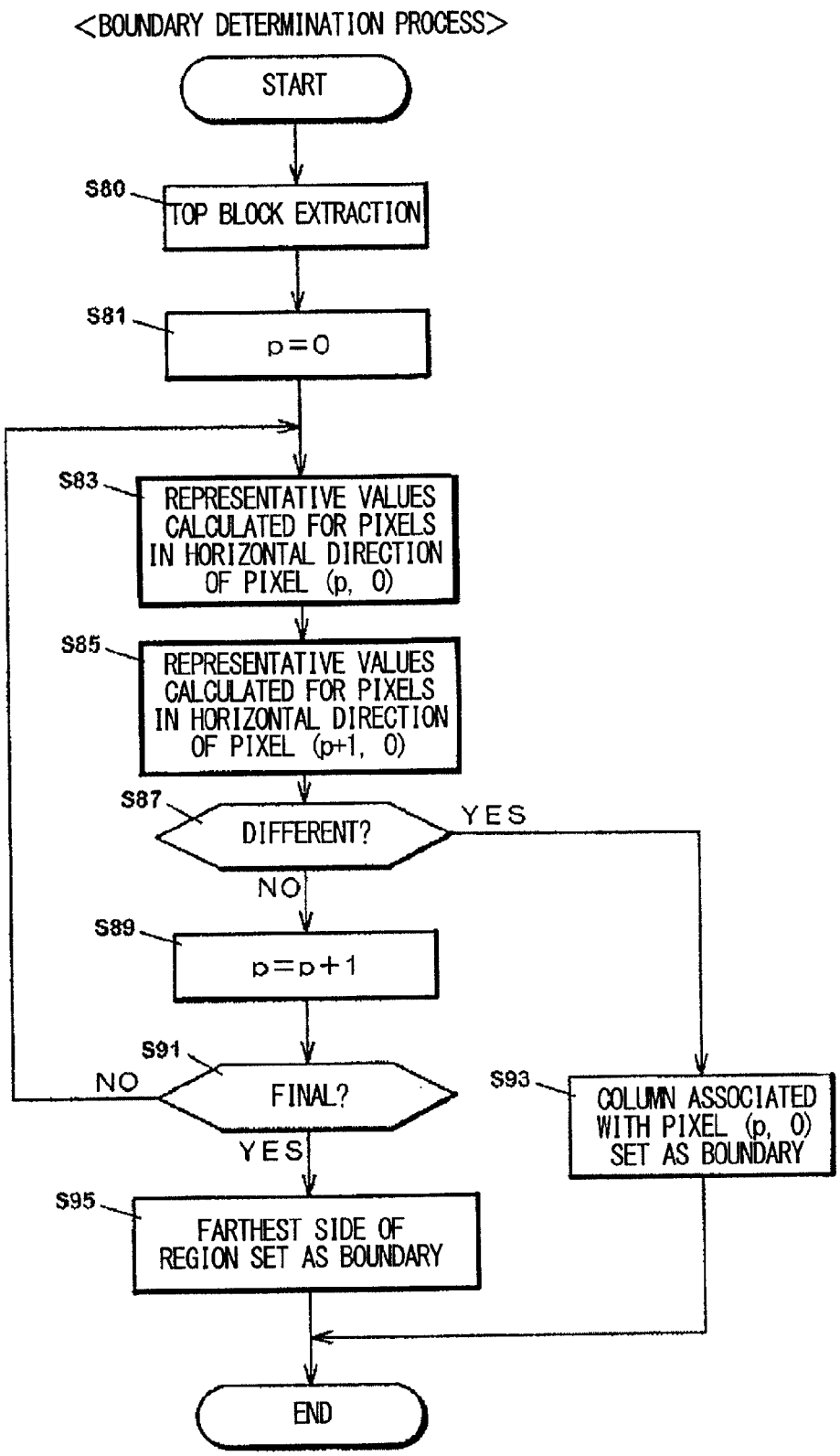
FIG. 15 is a flow chart of the boundary determination process.
Figure 16:
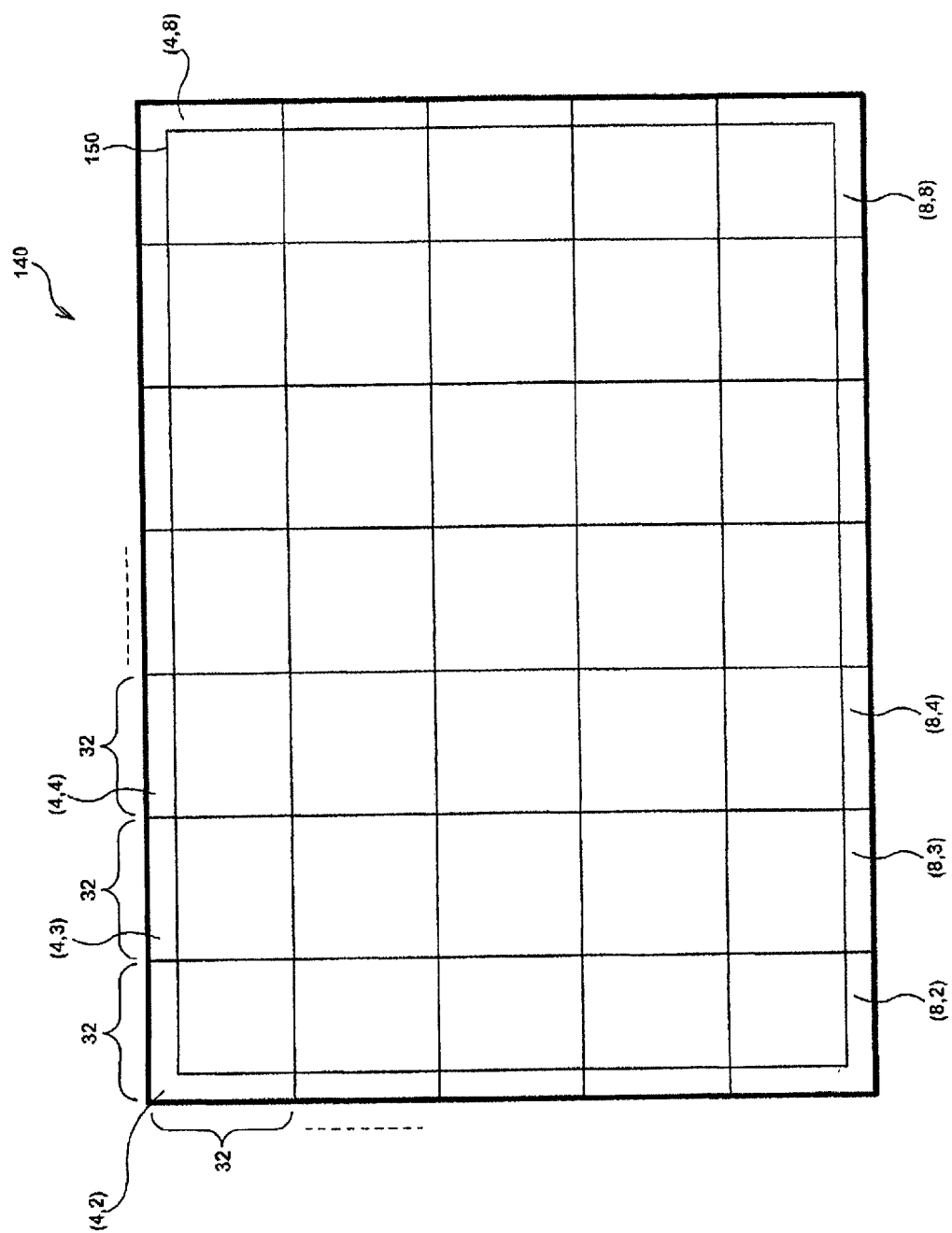
FIG. 16 shows the 32×32 bit arrangement within one block unit.

The CPU 23 extracts top blocks (step S80 of FIG. 15). In this case, a total of seven blocks are extracted, which are the blocks (4, 2) to (4, 8) shown in FIG. 16. The CPU 23 initializes the processing row number P (step S81), extracts all of the pixels in the P-th row of the extracted blocks, and calculates the representative values of these blocks (step S83). In this case, a total of 7×32 pixels are extracted, including the 32 pixels in the 0-th row of block (4, 2), the 32 pixels in the 0-th row of block (4, 3), etc., and representative values are calculated for these blocks. In the present embodiment, each representative value is calculated as the average of the extracted pixels.

Next, the CPU 23 extracts all of the pixels of the (P+1)-th row from the extracted blocks and calculates the representative values of these blocks (step S85). In this case, a total of 7×32 pixels are extracted, including the 32 pixels in the 1st row of block (4, 2), the 32 pixels in the 1st row of block (4, 3), etc., and representative values are calculated for these blocks.

The CPU 23 determines whether the representative values calculated as step S83 differ from the representative values calculated as step S85 (step S87). If these representative values differ at step S87, the CPU 23 determines that the row of pixels (P, 0) is a boundary (step S93). If the representative values do not differ at step S87, the CPU 23 increments the processing row number P (step S89) and repeats the steps from step 83 onward until reaching the final pixel of the extracted blocks, which is the 32nd pixel in this case (step S91). If the representative values do not differ at step S87 even for the final pixel, the CPU 23 determines that the end of the extracted block is the boundary (step S95).

FIG. 15 shows an example in which the boundary is extracted in units of 1 pixel in top blocks, but the extraction is performed in the same manner in the bottom blocks.

In this way, for the peripheral blocks, by extracting a single row of pixels in the horizontal direction from the top or bottom blocks, it is possible to obtain the boundary within the blocks in units of 1 pixel.

Concerning the left and right boundaries, one column of pixels in the vertical direction is extracted and the representative values of these blocks may be compared to those of an adjacent column.

In the present apparatus, the movement image region can be automatically detected. Furthermore, it is possible to make the determination based on several frames. Accordingly, even when the moving image region itself changes dynamically on a monitor, the moving image region can be detected practically in real time.

1.4 Second Embodiment

In the present embodiment, the shift between the movement region of an earlier frame and the movement region of a later frame is detected to determine whether the FRC process is performed. However, the present embodiment is not limited to this, and for any one of the frames, a target frame such as described below may be calculated and the movement region of this target frame may be compared to the movement region of another frame. The calculation of the target frame is performed in the following manner, for example. The difference between the pixel at the left edge and an adjacent pixel in the horizontal direction of the screen is calculated. In a case of a display region having such a black band, after the difference continues to be zero for a certain amount of time, the difference suddenly becomes a large value. The same phenomenon occurs on the right side of the screen. It is possible to determine the target region by calculating this at the right and left sides in the horizontal direction of the screen and the top and bottom sides in the vertical direction of the screen. For example, in the horizontal direction, there is a difference of zero continuing across several rows from the top, and when a difference of zero is detected, the following differences are also detected as zero. This type of detection may be performed for all rows, or a portion of the rows may be extracted and a determination may be made in this manner. By determining the target region of the FRC determination in this manner, when screen resolution is low, it is possible to remove the peripheral regions where the FRC process is not performed.

2. Other Embodiments

In the embodiments described above, a determination is made based on whether the shift between the movement region of the earlier frame and the movement region of the later frame is continuous for a number of frames less than or equal to a threshold value. In this way, noise can be removed. Furthermore, it is possible to distinguish normal moving images. This is because, in a normal moving image, even though a moving image region is detected once among several frames, moving image regions are almost never detected a plurality of times in series.

This is not limited to a case of continuous detections, and it may be determined that the FRC process is performed if the shift is less than or equal to the threshold value even once.

In the present embodiment, it is determined that the FRC process is performed if the shift between the movement region of the earlier frame and the movement region of the later frame is less than or equal to the threshold value, but the present embodiment is not limited to this, and it may be determined that the FRC process is performed if detection of a movement region and non-detection of a movement region are not repeated.

In the embodiments described above, movement detection is described as an example of the image processing performed after the FRC process. The detection by the FRC detection apparatus may be set to have higher precision than normal movement detection, since both are movement detection. In order to realize higher precision, a value may be adopted that enables the feature amounts of the blocks to be more accurately extracted. For example, the detection in the later image processing may include the feature amounts of the blocks using the average values of the pixels and, in the computation of the FRC detection, using CRC values or the like that enable more accurate determination as the movement detection feature amounts of the blocks.

Furthermore, instead of changing the nature of the feature amounts, the same feature amounts may be used and a precise determination may be enabled by increasing the minimum threshold value for the feature amount of each block.

In the above description, the display region is divided into blocks, but instead, a frame memory may be prepared and the determination of the movement regions may be made by comparisons in pixel units.

In the present embodiment, among 16 frames, the FRC detection is performed using the first 4 frames and the threshold value for the image processing is changed for the last 12 frames based on the FRC determination, but instead the process may be delayed by one period and the threshold value may be changed for the next set of 12 frames. Furthermore, the frame rate of the input image and the display rate of the monitor are arbitrary.

In the embodiments described above, the entire screen is detected as the movement region in a case where the entire screen is detected as the moving image region based on the earlier frame and the later frame, but in this case, a determination may be made that no movement region is detected.

In the present embodiment, as shown in FIGS. 6 to 16, in the extraction of the movement region, the blocks positioned at the periphery of the movement region are determined and the blocks contained therein are determined to be the movement region, but the technique for determining the rectangular movement region is not particularly limited.

In the present embodiment, luminance values are adopted as the pixel values, but RGB values or the like may be adopted instead.

In the embodiments described above, a movement region determination apparatus is described as an example of the image processing apparatus, but for other types of image processing apparatuses, such as a text detection apparatus or noise elimination apparatus, it is possible to perform suitable image processing even for images that have undergone the FRC process, by changing the threshold value of the image processing performed in post-processing in the same manner based on the detection results of the FRC process.

The present apparatus may be configured as a monitor that further includes an FRC processing section, and can be configured as a video board that further includes an FRC processing section. Furthermore, an FRC processing section may be mounted on a video board and configured as a monitor including the present apparatus.

Even when the frame rate of the input image is 60 FPS, if a portion of the input image is a still image region, it is possible to determine whether the FRC process is performed. Furthermore, with this frame rate, when the entire screen is the movement region, there is a concern that it would be impossible to detect whether the image has undergone the FRC process, but in such a case, a temporal FRC process is not performed, and therefore this is not particularly a problem.

In the embodiments described above, the CPU 23 and software are used to realize the functions shown in FIG. 1. However, some or all of these functions may be realized by hardware such as logic circuits. Some of the processes of the program may be performed by an operating system (OS).

LIST OF REFERENCE NUMERALS

23: CPU
25: RAM
26: flash memory

What is claimed is:
1. An image processing apparatus comprising:
an earlier frame movement region detecting means that detects an earlier frame movement region in an earlier frame of a plurality of frames for which it is unknown whether a frame rate control process has been performed;

a later frame movement region detecting means that detects a later frame movement region in a later frame that is positioned after the earlier frame;

a determining means that determines whether a frame rate control process has been performed on the basis of the earlier frame movement region and the later frame movement region, the determining means determining that a frame rate control process has been performed when a shift between the earlier frame movement region and the later frame movement region is less than or equal to a region shift threshold value and, on the basis of the determination that a frame rate control process has been performed, outputting a parameter change command for changing a threshold value of an image processing parameter; and an image processing means that, upon receiving the parameter change command, changes the threshold value of the image processing parameter.

2. The image processing apparatus according to claim 1, wherein the determining means determines that a frame rate control process has been performed when the shift determination is made repeatedly a plurality of times for continuous frames.

3. The image processing apparatus according to claim 1, wherein each frame movement region is formed by blocks that are each formed by a plurality of pixels.

4. The image processing apparatus according to claim 2, wherein each frame movement region is formed by blocks that are each formed by a plurality of pixels.

5. The image processing apparatus according to claim 1, wherein the image processing means is a rectangular movement region determining means that, upon receiving the parameter change command, performs the change by increasing a threshold value of an image processing parameter for determining a movement region.

6. The image processing apparatus according to claim 2, wherein the image processing means is a rectangular movement region determining means that, upon receiving the parameter change command, performs the change by increasing a threshold value of an image processing parameter for determining a movement region.

7. The image processing apparatus according to claim 3, wherein the image processing means is a rectangular movement region determining means that, upon receiving the parameter change command, performs the change by increasing a threshold value of an image processing parameter for determining a movement region.

8. The image processing apparatus according to claim 1, wherein the image processing means is a text region determining means that, upon receiving the parameter change command, performs the change by decreasing a threshold value of an image processing parameter for determining a text region.

9. The image processing apparatus according to claim 2, wherein the image processing means is a text region determining means that, upon receiving the parameter change command, performs the change by decreasing a threshold value of an image processing parameter for determining a text region.

10. The image processing apparatus according to claim 3, wherein the image processing means is a text region determining means that, upon receiving the parameter change command, performs the change by decreasing a threshold value of an image processing parameter for determining a text region.

11. The image processing apparatus according to claim 1, wherein the image processing means is a noise eliminating means that, upon receiving the parameter change command, performs the change by increasing a threshold value of an image processing parameter for determining noise.

12. The image processing apparatus according to claim 2, wherein the image processing means is a noise eliminating means that, upon receiving the parameter change command, performs the change by increasing a threshold value of an image processing parameter for determining noise.

13. The image processing apparatus according to claim 3, wherein the image processing means is a noise eliminating means that, upon receiving the parameter change command, performs the change by increasing a threshold value of an image processing parameter for determining noise.

14. A rectangular movement region detection apparatus including a rectangular movement region detecting means that detects a rectangular movement region upon receiving image data of each of a plurality of frames for which it is unknown whether a frame rate control process has been performed, the rectangular movement region detection apparatus comprising:

a determining means that detects an earlier frame rectangular movement region in an earlier frame and a later frame rectangular movement region in a later frame that is positioned after the earlier frame and determines whether a frame rate control process has been performed on the basis of the earlier frame movement region and the later frame movement region, the determining means determining that a frame rate control process has been performed when a shift between the earlier frame rectangular movement region and the later frame rectangular movement region is less than or equal to a region shift threshold value and, on the basis of the determination that a frame rate control process has been performed, outputting a parameter change command for changing a threshold value of an image processing parameter; and a data providing means that provides the determining means with the image data for a portion of frames among the plurality of frames, wherein detection of frame movement regions by the determining means is performed with greater accuracy than a rectangular movement region determination by the rectangular movement region detecting means.

15. A frame rate control process detection apparatus comprising:

a frame rectangular movement region detecting means that detects a frame rectangular movement region in each of a plurality of frames, for which it is unknown whether a frame rate control process has been performed, upon receiving image data of the plurality of frames; and a determining means that determines whether a frame rate control process has been performed on the basis of the frame rectangular movement regions, the determining means determining that a frame rate control process has been performed when a shift between an earlier frame rectangular movement region of an earlier frame detected by the frame rectangular movement region detecting means and a later frame rectangular movement region in a later frame that is positioned after the earlier frame is less than or equal to a region shift threshold value and, on the basis of the determination that a frame rate control process has been performed, outputting a parameter change command for changing a threshold value of an image processing parameter.

16. An image processing method comprising:

detecting an earlier frame movement region in an earlier frame of a plurality of frames for which it is unknown whether a frame rate control process has been performed;

detecting a later frame movement region in a later frame that is positioned after the earlier frame;

determining whether a frame rate control process has been performed on the basis of the earlier frame movement region and the later frame movement region, said determining including determining that a frame rate control process has been performed when a shift between the earlier frame movement region and the later frame movement region is less than or equal to a region shift threshold value and, on the basis of the determination that a frame rate control process has been performed, outputting a parameter change command for changing a threshold value of an image processing parameter; and upon receiving the parameter change command, changing the threshold value of the image processing parameter.

17. A frame rate control process detection method comprising:

detecting a frame rectangular movement region in an earlier frame upon receiving image data of a plurality of frames, for which it is unknown whether a frame rate control process has been performed, relating to the earlier frame;

detecting a frame rectangular movement region in a later frame upon receiving image data of a plurality of frames, for which it is unknown whether a frame rate control process has been performed, relating to the later frame that is positioned after the earlier frame; and determining whether a frame rate control process has been performed on the basis of the frame rectangular movement regions, said determining including determining that a frame rate control process has been performed when a shift between the rectangular movement region of the earlier frame and the rectangular movement region of the later frame is less than or equal to a region shift threshold value and, on the basis of the determination that a frame rate control process has been performed, outputting a parameter change command for changing a threshold value of an image processing parameter.

* * * * *